United States Patent [19]

West

[11] 3,866,329

[45] Feb. 18, 1975

[54] COMBINATION VERTICAL AND HORIZONTAL PLUMB BOB

[75] Inventor: Robert F. West, West Simsbury, Conn.

[73] Assignee: The Stanley Works, New Britain, Conn.

[22] Filed: Mar. 27, 1974

[21] Appl. No.: 455,195

[52] U.S. Cl. ................................................. 33/392
[51] Int. Cl. ............................................ G01c 15/10
[58] Field of Search .............. 33/391, 392, 393, 394

[56] References Cited
UNITED STATES PATENTS
790,813   5/1905   Auld ............................... 33/391 X FOREIGN PATENTS OR APPLICATIONS
1,960   8/1911   Great Britain ....................... 33/392

Primary Examiner—Samuel B. Rothberg
Assistant Examiner—Charles E. Phillips

[57] ABSTRACT

A combination plumb bob is provided having both a vertical position and a horizontal position in which it is operable to determine verticality. The plumb bob comprises a disc shaped body having suspension means cooperatively associated therewith. The disc shaped body is preferably provided with a hollow center affording an unobstructed view therethrough. At substantially equally distant spaced points around the inner circumference thereof, the disc shaped body is provided with a plurality of inwardly projecting portions which terminate short of the center of the disc shaped body. First indexing means are formed at substantially equally distant points along the outer circumference of the disc shaped body operable to determine verticality when the plumb bob occupies its horizontal operating position. Second indexing means are also provided on the outer circumference of the disc shaped body in spaced relation to the first indexing means. The second indexing means are operable for determining verticality when the plumb bob occupies its vertical operating position. Suspension means are detachably secured to the disc shaped body operable to permit the disc shaped body to be suspended therefrom in either a horizontal position or a vertical position. Detent means are provided on the disc shaped body operable for locking the disc shaped body in a first position relative to the suspension means corresponding to the horizontal operating position of the plumb bob and for locking the disc shaped body in a second position relative to the suspension means corresponding to the vertical operating position of the plumb bob. The suspension means is provided with attaching means operable for securing a cord thereto. In addition, the suspension means embodies storage means operable for purposes of storing the cord thereon in an unextended condition when the plumb bob is not being utilized.

10 Claims, 11 Drawing Figures

COMBINATION VERTICAL AND HORIZONTAL PLUMB BOB

BACKGROUND OF THE INVENTION

The term plumb bob or plummet is conventionally used to refer to devices which are operable to determine the verticality to ground by virtue of gravitational forces. The form of plumb bob most often found employed heretofore in the prior art has been that which consists of a cone-shaped weighted member which is designed to be suspended with the pointed end thereof pointing downward at the end of a cord-like member such as for example, a length of cord, string, etc., the latter commonly being referred to as a plumb line. The preferred manner in which such a plumb bob is employed comprises employing the pointed end of the cone-shaped member to determine the spot on the ground or other equivalent surface which is vertically aligned with the point from which the plumb line to which the cone-shaped member is attached is suspended. Notwithstanding the universality with which the aforereferenced form of plumb bob has been employed previously, this form of plumb bob nevertheless has been characterized by the fact that it inherently possesses a number of undesirable features.

More particularly, one disadvantageous feature of the aforementioned form of plumb bob is that its use requires that the plumb bob be firmly suspended with the pointed end thereof positioned in close proximity to the ground. This is necessary in order to be able to accurately identify the spot on the ground to which the pointed end of the plumb bob is pointing. Moreover, when the plumb bob ceases its pendulum-like swinging, it is almost necessary for one to lie prone on the ground to determine the spot thereon which is being indicated by the pointed end of the plumb bob. It should thus be readily apparent that to make efficient usage of such a plumb bob requires the efforts of two people, namely one to suspend the plumb bob and the other to determine and mark the spot on the ground which is being designated by the indicator portion, i.e., the pointed end of the plumb bob.

Likewise, the aforedescribed form of plumb bob has been found to be difficult to employ in those situations wherein the spot on the ground is known and it is desired for one reason or another to locate a point spaced from but vertically aligned with the known spot on the ground. In such a case, with the pointed end of the plumb bob positioned over the known spot on the ground, it is necessary to sight along the plumb bob to locate the desired point. This is most often found to involve a time consuming process requiring a plurality of hit and miss attempts before the desired result is achieved. A need also exists in this type of application for the services of two people, i.e., one to guide the pointed end of the plumb bob over the known spot on the ground and the other to identify the desired point vertically spaced from the aforesaid known spot.

With reference to the prior art, it is readily apparent from a review thereof that the aforedescribed type of plumb bob has been provided heretofore in a plurality of different forms. Most often, however, the differences which reside between various ones of these different forms of the aforedescribed type of plumb bob involve changes in appearance and/or the embodiment therein of features of an accessory nature such as automatic marking means, etc. Insofar as concerns the general shape of prior art forms of plumb bobs, one basic departure therein is described in British Pat. No. 1960 of the year 1911. The latter patent is directed to a plumb bob which is of generally circular configuration. As described therein, the plumb bob has a ring-like shape and is intended to be suspended from three spaced points located around the circumference thereof. As set forth in the subject patent, one advantage of this type of structure is that the plumbing point thereof is situated at or very close to the center of oscillation of the plumb bob. Another advantage attributed to a plumb bob embodying the aforedescribed structure is that such a design facilitates the observance of the plumbing point of the plumb bob. However, although as evidenced by the British patent, it has been known for over sixty years to provide a plumb bob having a ring-shape very little use has been made of this type of construction heretodate.

Therefore, although the prior art evidences the fact that it has long been known to employ plumb bobs to determine the verticality to ground by gravitational forces, and that there have been some attempts at making improvements in the construction of prior art plumb bobs, it is also to be noted from reference to the prior art that very little in the way of significant changes has acutally been made therein. There has thus existed a need to provide a plumb bob which would overcome the disadvantages possessed by prior art forms of plumb bob referred to hereinabove as well as one which would embody various other advantages in construction and in manner of employment in comparison to known prior art forms of plumb bobs.

Accordingly, it is an object of the present invention to provide a novel and improved plumb bob operable to determine the verticality to ground by gravitational forces.

It is another object of the present invention to provide such a plumb bob which is characterized by its novel configuration and facility by which it may be employed.

A further object of the present invention is to provide such a plumb bob which embodies means operable to provide the plumb bob with both a horizontal operating position and a vertical operating position.

A still further object of the present invention is to provide such a plumb bob embodying storage means operable for storing a plumb line thereon during periods when the plumb bob is not being utilized.

Yet another object of the present invention is to provide such a plumb bob embodying a construction capable of providing measurements with a high level of accuracy.

Yet still another object of the present invention is to provide such a plumb bob which is capable of being operated by a single person.

SUMMARY OF THE INVENTION

It has now been found that the foregoing and related objects can be readily attained in a plumb bob adapted to be employed to determine the verticality to ground by gravitational forces. The plumb bob includes a disc shaped body and suspension means cooperatively associated therewith. The disc shaped body is provided with a substantially hollow interior thereby permitting an unobstructed view therethrough. Moreover, the disc shaped body is provided with a plurality of inwardly projecting portions which are formed at substantially equally distant spaced points around the inner circumference of the disc shaped body and which terminate short of the center of the disc shaped body. In addition, the disc shaped body is provided around the periphery of its outer circumference with first and second indexing means. The first indexing means are spaced at substantially equally distant intervals around the outer circumference of the disc shaped body. The second indexing means are located so as to be positioned in equally spaced relation from the first indexing means. The first indexing means is operable to determine the verticality to ground when the plumb bob occupies its horizontal operating position, while the second indexing means is operable to determine the verticality to ground when the plumb bob occupies its vertical position. The aforementioned suspension means is detachably secured to the disc shaped body and is operable to permit the disc shaped body to be suspended therefrom in either a horizontal position or a vertical position. The disc shaped body is also provided with detent means operable for locking the disc shaped body in a first position relative to the suspension means corresponding to the horizontal operating position of the plumb bob and for locking the plumb bob in a second position relative to the suspension means corresponding to the vertical operating position of the plumb bob. Also, the suspension means embodies both attaching means and storage means. The attaching means is operable for attaching one end of a plumb line thereto to provide the means whereby the plumb bob is capable of being suspended from a plumb line in order to obtain measurements as to verticality. The storage means is operable for storing the plumb line thereon when the plumb bob is not being used.

In accord with the preferred embodiment of the invention, there are four projections formed around the periphery of the inner circumference of the disc shaped body which are located thereon so as to be spaced approximately 90° apart from each other. The first indexing means comprises four V-shaped notches which are formed in the outer circumference of the disc shaped body so as to be positioned approximately 90° apart. The second indexing means comprises a pair of V-shaped projections extending outwardly from the outer circumference of the disc shaped body and arranged so as to be spaced approximately 180° apart. The suspension means comprises a wire-like member having a pair of inturned ends extending towards each other which are each detachably received in a corresponding one of a pair of openings provided for this purpose in the opposite side wall portions of the disc shaped body. Intermediate its ends and more specifically approximately midway therebetween, the wire-like member is provided with a V-shaped bend operable for attaching one end of a plumb line thereto whereby the plumb bob is capable of being suspended from the plumb line for purposes of making measurements as to verticality. Between the aforedescribed V-shaped bend and each end of the wire-like member, there is provided one of a pair of inwardly extending bends. The latter pair of bends are provided along the length of the wire-like member so as to be located in opposing relation relative to each other. The aforereferenced pair of bends provide a means whereby the plumb line may be wound therebetween for purposes of storing the plumb line on the plumb bob and more specifically the suspension means thereof during periods when the plumb bob is not being employed.

DETAILED DESCRIPTION OF THE ILLUSTRATED EMBODIMENT

Figure 1:
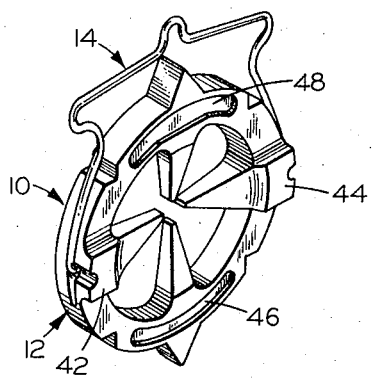
FIG. 1 is a perspective view of a plumb bob constructed in accordance with the present invention.

Referring now to the drawings, and more particularly FIG. 1 thereof, there is illustrated therein a plumb bob, generally designated by reference numeral 10, constructed in accordance with the present invention. The plumb bob 10 includes a disc shaped body 12 and a suspension means 14 cooperatively associated therewith. As best seen with reference to FIGS. 2 and 3 of the drawings, projecting inwardly from the inner circumference 16 of the disc shaped body 12 there are a plurality of inwardly inclining projections 18, 20, 22 and 24. In accord with the illustrated embodiment of the invention, the latter projections 18, 20, 22 and 24 are formed as an integral part of the disc shaped body 12 and are suitably positioned thereon so as to be substantially equally distantly spaced relative to each other. In addition, the length of each of the projections 18, 20, 22 and 24 is such that they terminate short of the center 26 of the disc shaped body 12 thereby providing an unobstructed view therethrough.

Figure 2:
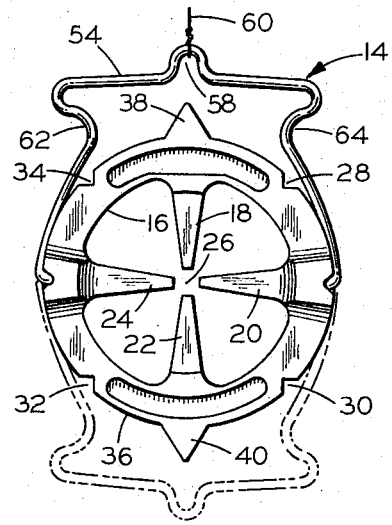
FIG. 2 is a front view of a plumb bob constructed in accordance with the present invention illustrated with one end of a plumb line attached thereto and with the suspension means of the plumb bob depicted in solid lines in a first position and in broken lines in a second position.
Figure 4:
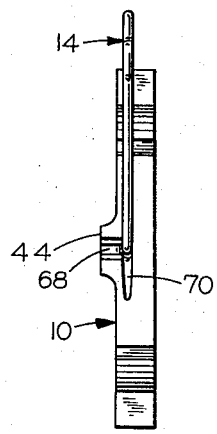
FIG. 4 is a side elevational view of a plumb bob constructed in accordance with the present invention.
Figure 3:
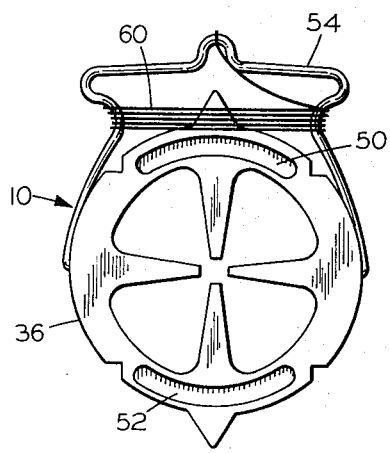
FIG. 3 is a rear view of a plumb bob constructed in accordance with the present invention illustrated with a plumb line wrapped around the suspension means of the plumb bob in the stored condition thereof.
Figure 5:
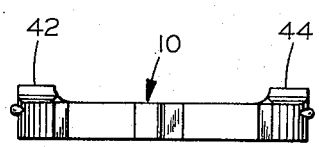
FIG. 5 is a bottom view of a plumb bob constructed in accordance with the present invention.
Figure 6:
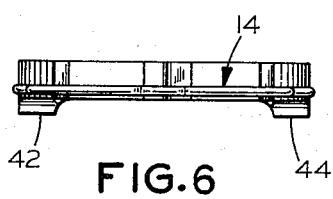
FIG. 6 is a top view of a plumb bob constructed in accordance with the present invention.

Continuing with a description of the construction of the disc shaped body 12, the latter as best seen with reference to FIGS. 2 and 3 of the drawings, is provided with a first indexing means consisting of four V-shaped notches 28, 30, 32 and 34 formed in the periphery of the outer circumference 36 of the disc shaped body 12. The first indexing means, in a manner to be more fully described hereinafter, is operable for purposes of determining the verticality to ground or a like surface when the plumb bob 10 is in its horizontal operating position. In addition, there is provided a second indexing means on the periphery of the outer circumference 36 of the disc shaped body 12. The second indexing means consists of a pair of V-shaped projections 38 and 40 which are located on the disc shaped body 12 so as to be positioned substantially 180° apart. Moreover, with reference to FIG. 2 of the drawings, it can be seen that the V-shaped projection 38 is positioned substantially midway between the V-shaped notches 28 and 34 of the first indexing means, while the V-shaped projection 40 is positioned substantially midway between the V-shaped notches 30 and 32 of the first indexing means. The second indexing means, i.e., the V-shaped portions 38 and 40 are operable in a manner to which further reference will be had hereinafter for purposes of determining the verticality to ground when the plumb bob 10 occupies its vertical operating position.

Figure 9:
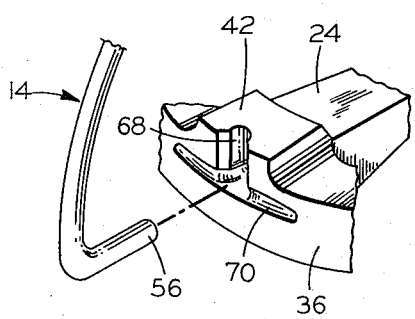
FIG. 9 is an exploded perspective view of a portion of the disc shaped body and the suspension means of a plumb bob constructed in accordance with the present invention.

As best understood with reference to FIGS. 2 and 9 of the drawings, the disc shaped body 12 in accord with the illustrated embodiment thereof is preferably provided with a pair of raised portions 42 and 44 formed integrally with and substantially 180° apart on the upper face of the disc shaped body 12. More specifically, the raised portions 42 and 44 are located so as to be spaced substantially 90° from each of the V-shaped projections 38 and 40. The function performed by the raised portions 42 and 44 will be set forth subsequently in connection with the description of the construction of the suspension means 14 of the plumb bob 10. In addition, as seen in FIGS. 1 and 2 of the drawings, a pair of arcuate recesses 46 and 48 are formed in the front face of the disc shaped body 12 adjacent to but spaced from each of the V-shaped projections 38 and 40. Similarly, on the rear face of the disc shaped body 12 as shown in FIG. 3 of the drawings, there is also provided a second pair of arcuate recesses 50 and 52 having like dimensions to those of the recesses 46 and 48. Moreover, the recesses 50 and 52 on the rear face of the disc shaped body 12 are also suitably located thereon so as to be adjacent to but spaced from the V-shaped projections 38 and 40. The recesses 46, 48, 50 and 52 provide a means whereby decals bearing suitable printed matter thereon such as the name of the manufacturer, the country of manufacture, etc. may be provided on the plumb bob 10. Obviously, however, this information could also be provided on the plumb bob 10 in some other manner such as by being stamped thereon, etc., or omitted entirely if so desired, whereby the aforedescribed recesses 46, 48, 50 and 52 could be eliminated, without departing from the essence of the present invention.

Referring again to the drawings, attention will next be directed to the construction of the suspension means 14. The latter means 14 includes a wire-like member 54 which terminates in a pair of inturned ends 56, only one of which is visible in the drawings. The ends 56 are preferably formed as a result of bending a portion of the member 54 of suitable length at each end thereof so that the bent portion, i.e., the end 56 extends inwardly substantially at right angles to the adjoining unbent portion of the member 54. Moreover, the inturned ends 56 are bent in such a manner that they extend towards each other and are spaced relative to each other by a distance which is less than the diameter of the disc shaped body 12, the latter spacing being provided for a purpose yet to be described.

At a point intermediate the ends 56 thereof, and more specifically substantially midway along the length thereof, the member 54 is provided with a generally V-shaped bend 58. The latter bend 58 functions as an attaching means. To this end, the portions of the member 54 which comprise the sides of the aforereferenced V-shaped bend 58 are sufficiently closely spaced so that they are able to function to cause a member which is attached to the point of the bend 58 to be maintained therebetween. Accordingly, as depicted in FIG. 2 of the drawings, in accord with one method of employing the plumb bob 10, the V-shaped bend 58 is intended to have attached thereto one end of a plumb line 60. The latter plumb line 60 in a manner well known to those skilled in the art is operable for purposes of suspending the plumb bob 10 therefrom whereby the latter may be employed for purposes of determining the verticality to ground by gravitational forces of the point (not shown) to which the other end of the plumb line 60 is attached when a point on the ground is known, or may be employed for purposes of determining the verticality to ground when the point at which the other end of the plumb line 60 is known.

As best understood with reference to FIGS. 2 and 3 of the drawings, the suspension means 14 of plumb bob 10 is further provided with a pair of inwardly extending bends 62 and 64. The latter bends 62 and 64 are formed by bending portions of the wire-like member 54 inwardly at points spaced from the V-shaped bend 58 but intermediate the latter and each of the inturned ends 56. More particularly, the bends 62 and 64 are located so as to be positioned opposite each other and more nearly adjacent the V-shaped bend 58 than the inturned ends 56 of the wire-like member 54. In the manner depicted in FIG. 3 of the drawings, the bends 62 and 64, function as a storage means wherein the plumb line 60 can be wound between the bends 62 and 64 around the wire-like member 54 when the plumb bob 10 is not being used. It can thus be seen that the bends 62 and 64 perform a useful function in minimizing the possibility that the plumb line 60 will become damaged, or detached and lost during periods when the plumb bob 10 is not being employed.

The manner in which the suspension system 14 and the disc shaped body 12 are cooperatively associated will now be set forth. As best understood with reference to FIGS. 9, 10 and 11 of the drawings, the disc shaped body 12 has a pair of openings 66 formed therein, only one of which is visible in the drawings. The latter openings 66 are provided on the disc shaped body 12 in the side walls thereof at the places where the raised portions 42 and 44 are located. The openings 66 are suitably demensioned so as to be capable of receiving therein the inturned ends 56 of the wire-like member 54. As described previously hereinabove, the spacing between the ends 56 of the member 54 is less than the diameter of the disc shaped body 12. Consequently, in order to insert the ends 56 in the openings 66, the ends 56 must be first biased, i.e., moved apart so as to permit the ends 56 to span the diameter of the disc shaped body 12. With the ends 56 having been forced apart, the latter action being possible by virtue of the spring-like characteristics possessed by the wire-like member 54, the latter member 54 is positioned relative to the disc shaped body 12 so that the ends 56 of the former are located relative to the openings 66 in the manner which is depicted in FIG. 9 in the case of one of the inturned ends 56. Thereafter, the ends 56 are merely permitted to enter the openings 66 as a result of the removal therefrom of the biasing force which had been applied thereto. Once inserted into the openings 66, the ends 56 of wire-like member 54 will remain positioned therein by virtue of the fact that the natural tendency of the ends 56 of the member 54 is to move inwardly since the spacing therebetween is intentionally made less than the diameter of the disc shaped body 12. Namely, an outward biasing force continues to be applied to the wire-like member 54 by virtue of the engagement of the side walls of the disc shaped body 12 with the portions adjoining the inturned ends 56 of the member 54 when the latter ends 56 are positioned in the openings 66, and it is the force being exerted by the ends 56 of the wire-like member 54 in attempting to resist the aforedescribed biasing force which functions to maintain the suspension means 14 cooperatively associated with the disc shaped body 12.

Figure 10:
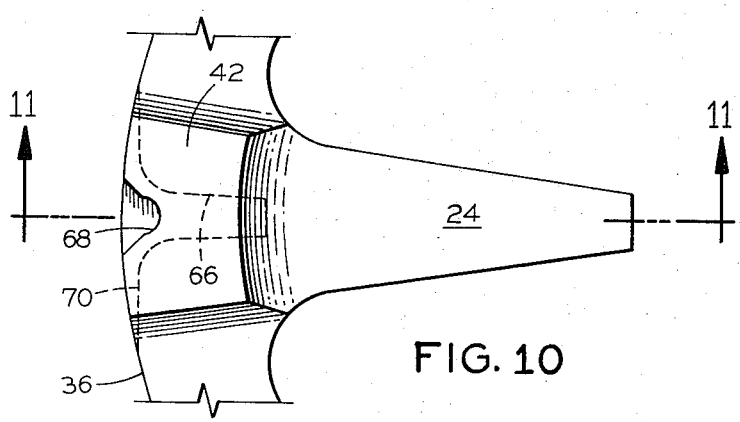
FIG. 10 is a top plan view of a portion of the disc shaped body of a plumb bob constructed in accordance with the present invention.
Figure 11:
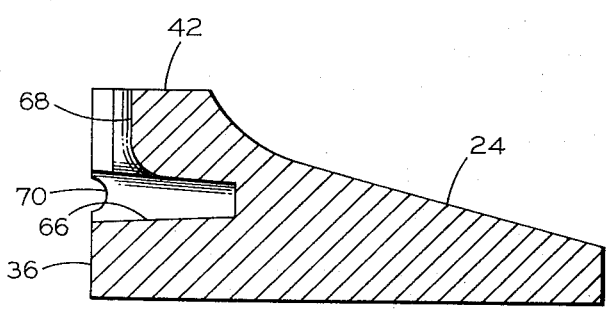
FIG. 11 is a cross-sectional view of a portion of a disc shaped body of a plumb bob constructed in accordance with the present invention taken substantially along the line 11—11 in FIG. 10.

Referring further to FIGS. 9–11 of the drawings, in accord with the illustrated embodiment of the invention detent means in the form of a plurality of notches 68 and 70 are provided in the side walls of the disc shaped body 12 adjacent to the location of the outer ends of the openings 66. The notches 68 and 70 as best seen with reference to the aforesaid figures of the drawings are formed so as to extend substantially at right angles to the major axis of each other. In addition, each of the notches 68 and 70 is suitably dimensioned so as to enable a corresponding portion of the wire-like member 54 to be received therein. Accordingly, it is possible to cause the disc shaped body 12 to occupy a first position relative to the suspension means 14 when portions of the wire-like member 54 are positioned in the notches 68, and to occupy a second position relative to the suspension means 14 when portions of the wire-like member 54 are received in either one of the notches 70. The aforereferenced first position comprises the horizontal operating position of the plumb bob 10, while the aforementioned second position comprises the vertical operating position of the plumb bob 10. It should be readily apparent based on the preceding description and the illustration thereof in the drawings, that the raised portions 42 and 44 of the disc shaped body 12 provide the means in which the aforesaid notches 68 are formed. In addition, it will be noted that by providing a pair of notches 70 at each side of the disc shaped body 12, it is possible to move the wire-like member 54 from the position thereof shown in solid lines in FIG. 2 to that shown in broken lines in the same figure. Moreover, it will be understood with reference to FIGS. 9–11 of the drawings that once the portions of the wire-like member 54 adjoining the inturned ends 56 thereof are received in either the notches 68 or either one of the pair of notches 70, they will remain locked therein by virtue of being captured between the side walls which define the corresponding ones of the notches. In order to be moved from one to another of the plurality of notches 68 and 70, it is necessary for the aforedescribed portions of the wire-like member 54 to be first biased outwardly a sufficient extent to permit them to clear the side walls defining the notches. Then, the wire-like member 54 can be pivoted about the axis defined by the axis of the openings 66 until the aforereferenced portions of the wire-like member 54 are aligned with the desired ones of the notches 68 and 70. Thereupon, by releasing the biasing force being applied thereto, the latter referenced portions of the wire-like member 54 may be permitted to snap into the desired notches.

The manner in which the plumb bob 10 is employed for purposes of determining the verticality to ground by gravitational forces of two points which are vertically aligned but spaced from each other, when the location of one of the two points is known will now be set forth. Reference will first be had to the mode of operation of the plumb bob 10 when the latter is occupying its vertical operating position. As seen in FIGS. 2 and 3 of the drawings, when the plumb bob 10 occupies its vertical operating position, the wire-like member 54 is positioned relative to the side walls of the disc shaped body 12 so that portions of the former are received in one of each pair of notches 70 whereby the disc shaped body 12 and the suspension means 14 bear the relationship relative to each other shown in FIGS. 2 and 3. It is, of course, to be understood that the wire-like member 54 could either occupy the position thereof depicted in solid lines in FIG. 2 or the position thereof depicted in broken lines in the same figure without altering the manner in which the plumb bob 10 is intended to function when the latter is occupying its vertical operating position. Consequently, with the disc shaped body 12 and the suspension means 14 aligned relative to each other, for purposes of description it will be assumed in the manner illustrated in solid lines in both FIGS. 2 and 3, one end of a plumb line 60 is attached to the attaching means provided therefor on the suspension means 14, i.e., the V-shaped bend 58. Moreover, it will be noted that the tips of the two V-shaped projections 38 and 40 form two points which function to define a line therebetween. Therefore, to determine the verticality by gravitational forces between a point on the ground or like surface with a point vertically aligned but spaced therefrom, with the location of either one of the two aforereferenced points being known, it is merely necessary to move the plumb bob 10 relative to the given point so that the plumb bob 10 is suspended at one end of the plumb line 60 with the imaginary line defined by the tips of the V-shaped projections 38 and 40 vertically aligned with the known point. Then by sighting along the aforesaid imaginary line established by the given point and the tips of the projections 38 and 40 in a direction away from the given point, it is possible to locate a point which is spaced from but aligned vertically with the known point.

Figure 7:
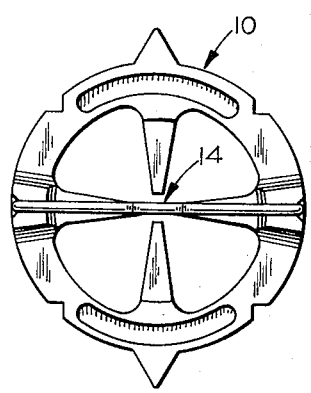
FIG. 7 is a top view of a plumb bob constructed in accordance with the present invention illustrated with the disc shaped body of the plumb bob occupying a first position relative to the suspension means of the plumb bob.
Figure 8:
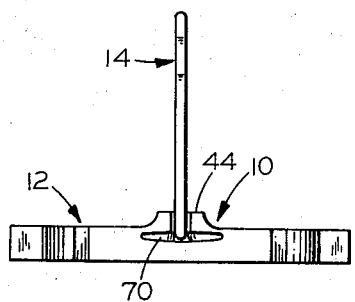
FIG. 8 is a side elevational view of a plumb bob constructed in accordance with the present invention with the disc shaped body of the plumb bob occupying the same position relative to the suspension means of the plumb bob as that illustrated in FIG. 7.

With the disc shaped body 12 and the suspension means 14 of the plumb bob 10 bearing the relative relationship to each other as depicted in FIGS. 2 and 3 of the drawings, in the event it were to be desired to have the plumb bob 10 occupy its horizontal operating position, namely, the position thereof illustrated in FIGS. 7 and 8 of the drawings, this is easily accomplished simply by biasing the side portions of the wire-like member 54 outwardly to permit the wire-like member 54 to be removed from the notches 70. Thereafter, the wire-like member 54 is pivoted relative to the disc shaped body 12 to the position thereof shown in FIGS. 7 and 8, until the side portions of the wire-like member 54 are aligned with the notches 68 whereupon the biasing force is removed and the wire-like member 54 is permitted to snap into the notches 68.

The maner of employing the plumb bob 10 when the latter is occupying its horizontal operating position is similar to that described above. However, in this instance four points, i.e., the inner end of each of the projections 18, 20, 22 and 24 define a point at the center 26 of the disc shaped body 12 which is employed to determine verticality. More specifically, with the plumb bob 10 being attached to one end of the plumb line 60 so as to be suspended therefrom, to determine the verticality of two points vertically aligned but spaced apart where the location of one of the points is known, the plumb bob 10 is positioned relative to the location of the known point so that the point at the center 26 of the disc shaped body 12 defined by the inner ends of the projections 18, 20, 22 and 24 is aligned therewith. It is possible to determine this alignment by sighting along any two of the four notches 28, 30, 32 and 34 formed in spaced relation around the periphery of the outer circumference 36 of the disc shaped body 12, namely either the pair of notches 28 and 32, or the pair of notches 30 and 34. Obviously, the point whereat the imaginary line connecting the notches 28 and 32 intersects the imaginary line connecting the notches 30 and 34 represents the precise center of the disc shaped body 12 when the latter occupies the position thereof relative to the suspension means 14 depicted in FIGS. 7 and 8. In accord with the illustrated embodiment of the invention, the latter task is facilitated by forming the projections 18, 20, 22 and 24 so that the upper surface thereof is inclined downwardly from the outer to the inner end thereof whereby to cause the center 26 of the disc shaped body 12 established therebetween to be more distinctly defined in the nature of a point. Accordingly, by aligning the point at the center 26 of the disc shaped body 12 with the known point, an imaginary line is established defined by the two points, i.e., the known point and the point at the center 26 of the disc shaped body 12. Moreover, when the two aforereferenced points are aligned, it is possible to determine the location of a point which lies along the aforementioned imaginary line and which is spaced from but aligned vertically with the known point, and to suitably mark the location of the unknown point as determined through the use of the plumb bob 10.

When it is no longer desired to utilize the plumb bob 10, the latter is preferably made to occupy its vertical operating position. The reason for this is that in the latter position, the suspension means 14 is capable of functioning as a form of cage for the disc shaped body 12 wherein the latter is locked against movement relative to the former, and with approximately half of the disc shaped body 12 being located within the two depending side portions of the wire-like member 54 which terminate in the inturned ends 56. Moreover, the plumb line 60 is preferably wound between the bends 62 and 64 formed in the wire-like member 54 and thereby around the suspension means 14. This provides another means which is operable to further ensure that the disc shaped body 12 and the suspension means 14 remain positioned relative to each other in the manner illustrated in FIG. 3 of the drawings.

In accord with one embodiment of the invention, the disc shaped body 12 has a basic diameter of approximately 2 inches with the projections 38 and 40 each projecting outwardly therefrom an additional one fourth inch. In addition, the disc shaped body 12 has a thickness of approximately one fourth inch and the total weight of the entire plumb bob 10 is approximately one eighth of a pound. Finally, the wire-like member 54 measures approximately 1 ⅞ inches from the bend 62 to the bend 64, and the bend 68 thereof is spaced approximately three eighths inches from the nearest projection 38 or 40 when the plumb bob 10 occupies its vertical operating position.

Although only one embodiment of a plumb bob constructed in accordance with the present invention has been shown in the drawings and described hereinabove, it is to be understood that modifications in the construction thereof may be made thereto by those skilled in the art without departing from the essence of the invention. In this connection, some of the modifications which can be made in the plumb bob 10 have been alluded to hereinabove while others will become readily apparent to those skilled in the art when exposed to the present description and illustration of the construction of the plumb bob 10. For example, as described hereinabove, the upper surfaces of one of the inwardly extending projections 18, 20, 22 and 24 of the disc shaped body 12 is inclined in order to facilitate the sighting along and to more sharply establish the point created at the center 26 of the disc shaped body 12 by the inner ends of the projections 18, 20, 22 and 24. However, if so desired, the upper surfaces of the projections 18, 20, 22 and 24 could be made straight without departing from the essence of the invention. Moreover, the disc shaped body 12 has been described hereinabove as being provided with a pair of notches 70 along each of the two sides thereof. Obviously, however, one notch 70 in each of the two sets thereof could be eliminated if so desired without departing from the essence of the invention. Also, the disc shaped body 12 could be provided without departing from the essence of the invention with another type of detent means, if so desired, operable for purposes of locking the suspension means 14 and the disc shaped body 12 either in the position thereof corresponding to the horizontal operating position of the plumb bob 10 or the position thereof corresponding to the vertical operating position of the plumb bob 10.

Finally, the disc shaped body member could be provided instead, if so desired, with a pair of mounting means each independently operable for connecting the suspension means thereto wherein the suspension means is mounted in one of the pair of mounting means for employing the plumb bob with the body member disposed in a horizontal plane and wherein the suspension means is removed from the aforesaid one of the pair of mounting means and engaged in the other of the pair of mounting means for employing the plumb bob with the disc shaped body member rotated so as to be disposed in a plane which is 90° from the aforedescribed horizontal plane.

Thus, it can be seen that the present invention provides a novel and improved plumb bob operable to determine the verticality to ground by gravitational forces of two points spaced apart but aligned vertically when the location of one of the points is known. Moreover, in accord with the present invention such a plumb bob has been provided which is characterized by its novel configuration and the facility with which it may be employed. The plumb bob of the present invention embodies means operable to provide the plumb bob with both a horizontal operating position and a vertical operating position. Furthermore, a plumb bob has been provided in accord with the present invention embodying storage means operable for storing a plumb line thereon during periods when the plumb bob is not being utilized. Also, in accordance with the present invention a plumb bob has been provided embodying a construction capable of providing measurements with a high level of accuracy. Finally, the plumb bob of the present invention is capable of being operated by a single person.

Having thus described the invention, I claim:

1. A plumb bob for use in a horizontal or vertical plane comprising: a body member having an aperture extending therethrough at the center thereof, indexing means including a projection provided on the periphery of said body member in alignment with a line drawn through the center thereof, and suspension means engaged with said body member permitting suspension of said body member in said horizontal plane with the principal plane of said body member disposed perpendicularly with respect to the principal plane of said suspension means with said aperture in the center of said body and in said vertical plane with the principal plane of said body member and the principal plane of said suspension means lying in the same plane with said projection at the lower end of said body.

2. The plumb bob as set forth in claim 1 wherein said body member has a disc shaped configuration.

3. The plumb bob as set forth in claim 1 wherein said body member further includes a multiplicity of tapered pointers extending radially inwardly towards said aperture at the center of said body member.

4. The plumb bob as set forth in claim 1 wherein said indexing means comprises a pair of outwardly extending V-shaped projections spaced 180° apart on the periphery of said body member.

5. The plumb bob as set forth in claim 1 wherein said body member further has a multiplicity of notches provided on the periphery thereof such that an imaginary line extending through two specific notches intersects another imaginary line through two other specific notches at the pricise center of said body member.

6. The plumb bob as set forth in claim 1 wherein said suspension means is pivotally connected to said body member and includes a wire-like member having a pair of inturned end portions received by said body member.

7. The plumb bob as set forth in claim 6 wherein said suspension means includes attaching means provided at the midpoint of said wire-like member operable for attaching thereto one end of a plumb line enabling the plumb bob to be suspended from the plumb line.

8. The plumb bob as set forth in claim 7 wherein said suspension means includes storage means provided intermediate said end portions of said wire-like member operable for storing the plumb line thereon during periods when the plumb bob is being unemployed.

9. A plumb bob comprising:
a. a disc shaped body member having an aperture extending therethrough at the center thereof, a multiplicity of pointers extending radially inwardly towards said aperture at the center of said body member, and a multiplicity of notches provided on the periphery of said body member such that an imaginary line through two specific notches intersects another imaginary line through two other specific notches at the precise center of said body member; and
b. suspension means comprising a wire-like member pivotally connected to said body member permitting suspension of said body member therefrom in a first position comprising the operating position of the plumb bob wherein the principal plane of said body member is disposed perpendicularly with respect to the principal plane of said suspension means and in a second position comprising the storage position of the plumb bob wherein the principal plane of said body member and the principal plane of said suspension means lie in the same plane.

10. The plumb bob as set forth in claim 9 wherein attaching means are provided at the midpoint of said wire-like member operable for attaching thereto one end of a plumb line enabling the plumb bob to be suspended from the plumb line, and storage means are provided intermediate the ends of said wire-like member operable for storing the plumb line thereon during periods when the plumb bob is being unemployed.

* * * * *